(12) United States Patent
Xiao et al.

(10) Patent No.: US 12,073,064 B2
(45) Date of Patent: Aug. 27, 2024

(54) ABSTRACT GENERATION METHOD AND APPARATUS

(71) Applicant: HUAWEI TECHNOLOGIES CO., LTD., Guangdong (CN)

(72) Inventors: Jinghui Xiao, Beijing (CN); Chao Xing, Montréal (CA); Li Qian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 34 days.

(21) Appl. No.: 17/667,638

(22) Filed: Feb. 9, 2022

(65) Prior Publication Data

US 2022/0164090 A1 May 26, 2022

Related U.S. Application Data

(63) Continuation of application No. PCT/CN2020/089724, filed on May 12, 2020.

(30) Foreign Application Priority Data

Aug. 28, 2019 (CN) .......................... 201910804482.9

(51) Int. Cl.
*G06F 3/04842* (2022.01)
*G06F 3/04817* (2022.01)
*H04L 67/10* (2022.01)

(52) U.S. Cl.
CPC ...... *G06F 3/04842* (2013.01); *G06F 3/04817* (2013.01); *H04L 67/10* (2013.01)

(58) Field of Classification Search
CPC ............. G06F 3/04842; G06F 3/04817; G06F 3/0482; G06F 3/0488; G06F 16/44;
(Continued)

(56) References Cited

U.S. PATENT DOCUMENTS

| | | | | |
|---|---|---|---|---|
| 2004/0197071 | A1* | 10/2004 | Zhang | G06F 18/28 707/E17.028 |
| 2013/0317951 | A1* | 11/2013 | Kuznetsov | G06F 16/78 705/27.1 |
| 2020/0334468 | A1* | 10/2020 | Agarwal | G06F 40/56 |

FOREIGN PATENT DOCUMENTS

| | | |
|---|---|---|
| CN | 101013444 A | 8/2007 |
| CN | 102332017 A | 1/2012 |

(Continued)

OTHER PUBLICATIONS

"Automatic personalized video abstraction for sports video using metadata" Published Aug. 27, 2008 (Year: 2008).*

*Primary Examiner* — Pei Yong Weng
(74) *Attorney, Agent, or Firm* — HUAWEI TECHNOLOGIES CO., LTD.

(57) ABSTRACT

An abstract generation method and apparatus are provided, and relate to the field of artificial intelligence. The method includes: obtaining a content object; obtaining N thumbnails based on N pictures; generating M candidate abstracts based on text information and the N thumbnails; obtaining preference information of a user; selecting one of the M candidate abstracts as an abstract of the content object based on the preference information; and sending the abstract to a terminal device. In the method, a possibility that the user taps the abstract can be increased, and a content object delivery effect can be improved.

15 Claims, 9 Drawing Sheets

(58) Field of Classification Search
CPC ..... G06F 16/483; H04L 67/10; H04N 21/854; G06N 3/08; H04M 1/72472
See application file for complete search history.

(56) References Cited

FOREIGN PATENT DOCUMENTS

| | | | |
|---|---|---|---|
| CN | 102402603 | A | 4/2012 |
| CN | 104967647 | A | 10/2015 |

* cited by examiner

ABSTRACT GENERATION METHOD AND APPARATUS

CROSS-REFERENCE TO RELATED APPLICATIONS

This application is a continuation of International Application No. PCT/CN 2020/089724, filed on May 12, 2020, which claims priority to Chinese Patent Application No. 201910804482.9, filed on Aug. 28, 2019. The disclosures of the aforementioned applications are hereby incorporated by reference in their entireties.

TECHNICAL FIELD

This application relates to information flow technologies, and in particular, to an abstract generation method and apparatus.

BACKGROUND

In recent years, as a new content product form, an information flow has become a main manner used by people to obtain information. In an information flow product form, content is organized into a list page, and there are generally three manners of presenting the list page: a text-only manner, a single-picture manner, and a multi-picture manner. In the text-only manner, only a title of content is displayed. In the single-picture manner, a title of content and one thumbnail from the content are displayed. In the multi-picture manner, a title of content and a plurality of thumbnails from the content are displayed. Compared with a manner of displaying only the title, the thumbnail presents more abundant and intuitive information, and influences a user's behavior to a larger extent. In addition, in a gallery application of a terminal device, when the user creates a video or creates an album, one or more pictures may be selected to make a thumbnail, and the thumbnail is used as a cover, to intuitively display content of the video or the album to the user.

A current manner of selecting the thumbnail is: randomly selecting a picture or selecting a specific picture from pictures included in the content and using the picture as the thumbnail. However, thumbnails obtained in this selection manner are of a single type and are not representative, and cannot help improve an information delivery effect.

SUMMARY

This disclosure provides an abstract generation method and apparatus, to increase a possibility that a user taps an abstract, and improve a content object delivery effect.

According to a first aspect, this disclosure provides an abstract generation method, including:
obtaining a content object, where the content object includes text information and N pictures, and N is a natural number; obtaining N thumbnails based on the N pictures; generating M candidate abstracts based on the text information and the N thumbnails, where each candidate abstract includes the text information and at least one of the thumbnails, and M is a natural number; obtaining preference information of a user, where the preference information is obtained based on historical operation information of the user and/or attribute information of the user; selecting one of the M candidate abstracts as an abstract of the content object based on the preference information; and displaying the abstract or sending the abstract to a terminal device.

In this disclosure, a thumbnail is selected from the content object based on the preference information of the user, and is used for generating the abstract. In the abstract, the preference information obtained based on the historical operation information of the user and/or the attribute information of the user is considered, and therefore, the abstract is representative, so that a possibility that the user taps the abstract can be increased, and a content object delivery effect can be improved.

In an optional implementation, the historical operation information includes at least one of the following information: a title, a category, and an author that are of a historical content object tapped by the user, a quantity of tapping times and a tapping time that are of each historical content object, and viewing duration of each content object; the attribute information includes at least one of the following information: a sex, an age, and a location that are of the user, and a label selected by the user; and the preference information includes at least one of the following information: a category of a content object preferred by the user, a subject of the content object preferred by the user, and an affiliation of the content object preferred by the user.

In an optional implementation, the text information is a title of the content object.

In an optional implementation, the selecting one of the M candidate abstracts as an abstract of the content object based on the preference information includes: obtaining scores of the M candidate abstracts, where the score is used to indicate a possibility that a corresponding candidate abstract is tapped, and a higher score indicates a greater possibility that the corresponding candidate abstract is tapped; and selecting a candidate abstract with a highest score from the M candidate abstracts as the abstract.

In an optional implementation, the obtaining scores of the M candidate abstracts includes: extracting, by using a neural network model, features from text information and a thumbnail that are included in each of the M candidate abstracts, to obtain M multi-mode features, where each multi-mode feature includes a text feature of text information of a corresponding candidate abstract and an image feature of a thumbnail; and separately rating the M multi-mode features by using a rating model obtained through pre-training, to obtain scores of the M multi-mode features as the scores of the corresponding M candidate abstracts.

In an optional implementation, before the obtaining preference information of a user, the method further includes: obtaining the rating model through training based on historical preference information of the user.

In an optional implementation, the obtaining scores of the M candidate abstracts includes: obtaining the scores of the M candidate abstracts based on the preference information by using an explore and exploit policy.

According to a second aspect, this disclosure provides an abstract generation apparatus, including:
an obtaining module, configured to obtain a content object, where the content object includes text information and N pictures, and N is a natural number; a processing module, configured to: obtain N thumbnails based on the N pictures, and generate M candidate abstracts based on the text information and the N thumbnails, where each candidate abstract includes the text information and at least one of the thumbnails, and M is a natural number; where the obtaining module is further configured to obtain preference information of a user, where the preference information is obtained based on historical operation information of the user and/or attribute information of the user; and the processing module is further configured to select one of the M candidate abstracts as an abstract of the content object based on the preference information; and a sending module, configured to display the abstract or send the abstract to a terminal device.

In an optional implementation, the historical operation information includes at least one of the following information: a title, a category, and an author that are of a historical content object tapped by the user, a quantity of tapping times and a tapping time that are of each historical content object, and viewing duration of each content object; the attribute information includes at least one of the following information: a sex, an age, and a location that are of the user, and a label selected by the user; and the preference information includes at least one of the following information: a category of a content object preferred by the user, a subject of the content object preferred by the user, and an affiliation of the content object preferred by the user.

In an optional implementation, the text information is a title of the content object.

In an optional implementation, the processing module is specifically configured to: obtain scores of the M candidate abstracts, where the score is used to indicate a possibility that a corresponding candidate abstract is tapped, and a higher score indicates a greater possibility that the corresponding candidate abstract is tapped; and select a candidate abstract with a highest score from the M candidate abstracts as the abstract.

In an optional implementation, the processing module is specifically configured to: extract, by using a neural network model, features from text information and a thumbnail that are included in each of the M candidate abstracts, to obtain M multi-mode features, where each multi-mode feature includes a text feature of text information of a corresponding candidate abstract and an image feature of a thumbnail; and separately rate the M multi-mode features by using a rating model obtained through pre-training, to obtain scores of the M multi-mode features as the scores of the corresponding M candidate abstracts.

In an optional implementation, the processing module is further configured to: obtain the rating model through training based on historical preference information of the user.

In an optional implementation, the processing module is specifically configured to: obtain the scores of the M candidate abstracts based on the preference information by using an explore and exploit policy.

According to a third aspect, this disclosure provides an abstract generation apparatus, including:
one or more processors;
a memory, configured to store one or more programs, where
when the one or more programs are executed by the one or more processors, the one or more processors are enabled to implement the method according to any one of the first aspect or the possible implementations of the first aspect.

According to a fourth aspect, this disclosure provides a computer-readable storage medium, including a computer program. When the computer program is executed on a computer, the computer is enabled to perform the method according to any one of the first aspect or the possible implementations of the first aspect.

DESCRIPTION OF EMBODIMENTS

To make the objectives, technical solutions, and advantages of this disclosure clearer, the following clearly describes the technical solutions in this disclosure with reference to the accompanying drawings in this disclosure. It is clear that the described embodiments are merely a part rather than all of the embodiments of this disclosure. All other embodiments obtained by a person of ordinary skill in the art based on the embodiments of this disclosure without creative efforts shall fall within the protection scope of this disclosure.

In the embodiments, claims, and the accompanying drawings of this specification in this disclosure, the terms "first", "second" and the like are only used for distinction and description, and cannot be understood as indicating or implying relative importance or a sequence. Moreover, the terms "include", "have", and any other variant thereof are intended to cover a non-exclusive inclusion, for example, including a series of steps or units. Methods, systems, products, or devices are not necessarily limited to those explicitly listed steps or units, but may include other steps or units that are not explicitly listed or that are inherent to such processes, methods, products, or devices.

It should be understood that, in this disclosure, "at least one" means one or more, and "a plurality of" means two or more. The term "and/or" is used to describe an association relationship between associated objects, and represents that three relationships may exist. For example, "A and/or B" may represent the following three cases: Only A exists, only B exists, and both A and B exist, where A and B may be singular or plural. The character "/" usually indicates an "or" relationship between the associated objects. "At least one of the following" or a similar expression thereof indicates any combination of the following, including any combination of one or more of the following. For example, at least one (piece) of a, b, or c may represent: a, b, c, "a and b", "a and c", "b and c", or "a, b, and c", where a, b, and c may be singular or plural.

Some key terms involved in this disclosure are described as follows:

An information flow is a specific content organization manner, and particularly means a content flow presented by using a scrolling list.

An information flow product is a product in which an information flow is a main content presentation form. Representative products include a news application (APP), a video APP, a picture APP, and the like.

A list page is a main page on which the information flow product presents content, that is, a page on which all information is arranged in a form of a scrolling list and presented to a user.

An article presentation style on the list page is a form of combining an article title and a thumbnail on the list page. There are generally three types of styles: text-only, a single picture, and three pictures. In the "single picture" style and the "three pictures" style, combinations of the article title and different thumbnails determine a specific presentation style of the article.

Multi-mode feature: A simple text feature, a simple voice feature, and a simple image feature are referred to as single-mode features. A combination of two or even three of the foregoing single-mode features forms a multi-mode feature.

Explore and exploit, referred to as "E&E" for short, is one of policies in a recommending system, and is intended to maximize a global gain based on existing (but not all) information by using a specific policy. Famous solutions include an epsilon-Greedy algorithm, a Thompson sampling algorithm, a UCB (Upper confidence bound) algorithm, and a LinUCB algorithm.

Figure 1:
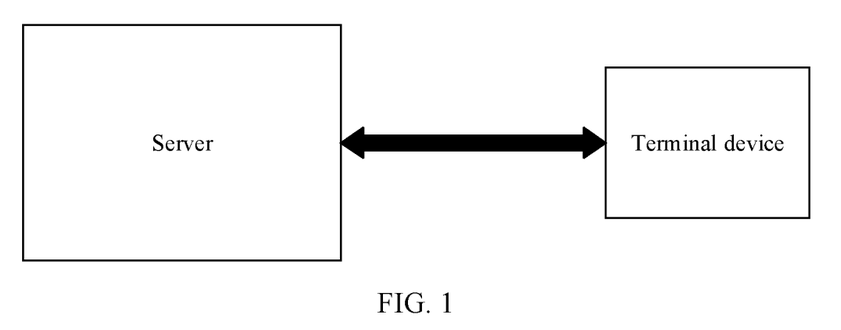
FIG. 1 is an example block diagram of an application scenario of an abstract generation method according to this disclosure.

FIG. 1 is an example block diagram of an application scenario of an abstract generation method according to this disclosure. As shown in FIG. 1, the scenario includes a server and a terminal device. The server may be a server of a supplier of an information flow product. The information flow product may be, for example, a video APP, a news APP, or a picture APP. To provide a content service for a user, a server may be deployed on a supplier of these APPs. The server may be used as a cloud platform, to ensure normal running of the APP, and also to collect personal data of a large quantity of users. A personalized abstract (for example, content to be presented on a list page of a client) of a content object is pushed to the user based on big data. The terminal device is used by the user as the client, and the user installs the foregoing APPs on the terminal device, so that content such as a video, news, and a picture can be obtained and viewed on the terminal device.

Figure 2:
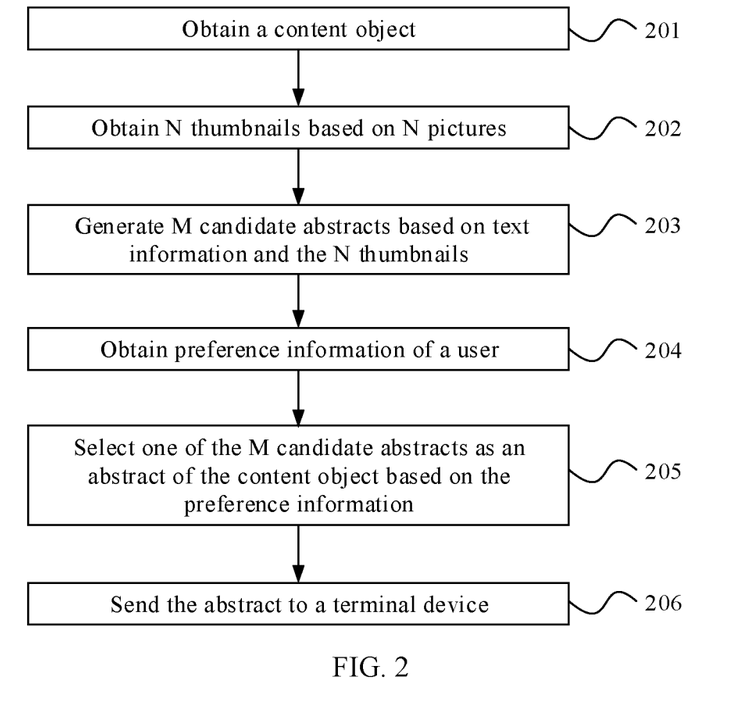
FIG. 2 is a flowchart of Embodiment 1 of an abstract generation method according to this disclosure.

FIG. 2 is a flowchart of an embodiment of an abstract generation method according to this disclosure. As shown in FIG. 2, the method in this embodiment may be performed by the server in FIG. 1, or may be performed by the terminal device in FIG. 1. For example, the abstract generation method in this disclosure is described below by using a server as an execution body. The abstract generation method may include the following steps.

Step 201: Obtain a content object.

The content object includes text information and N pictures, and N is a natural number. The server has collected a large quantity of content objects. The content objects may be, for example, edited news. The news includes text information such as a title, an abstract, and news content, and further includes some pictures that reflect a subject of the news. Alternatively, the content object may be, for example, a video such as a movie, a TV series, or a short video, and the video includes text information such as a title, a category, and a content description, and further includes an image frame in the video. Content objects involved in this disclosure have a common feature. For example, in addition to the text information, the content object further includes at least one picture. For example, the news includes one or more site photos, and the video is an image frame sequence including a plurality of frames of images.

Step 202: Obtain N thumbnails based on the N pictures.

The server compresses each picture in the content object to obtain the thumbnail. The thumbnail in this disclosure may be obtained by using an existing related technology. This is not specifically limited.

Step 203: Generate M candidate abstracts based on the text information and the N thumbnails.

Figure 3:
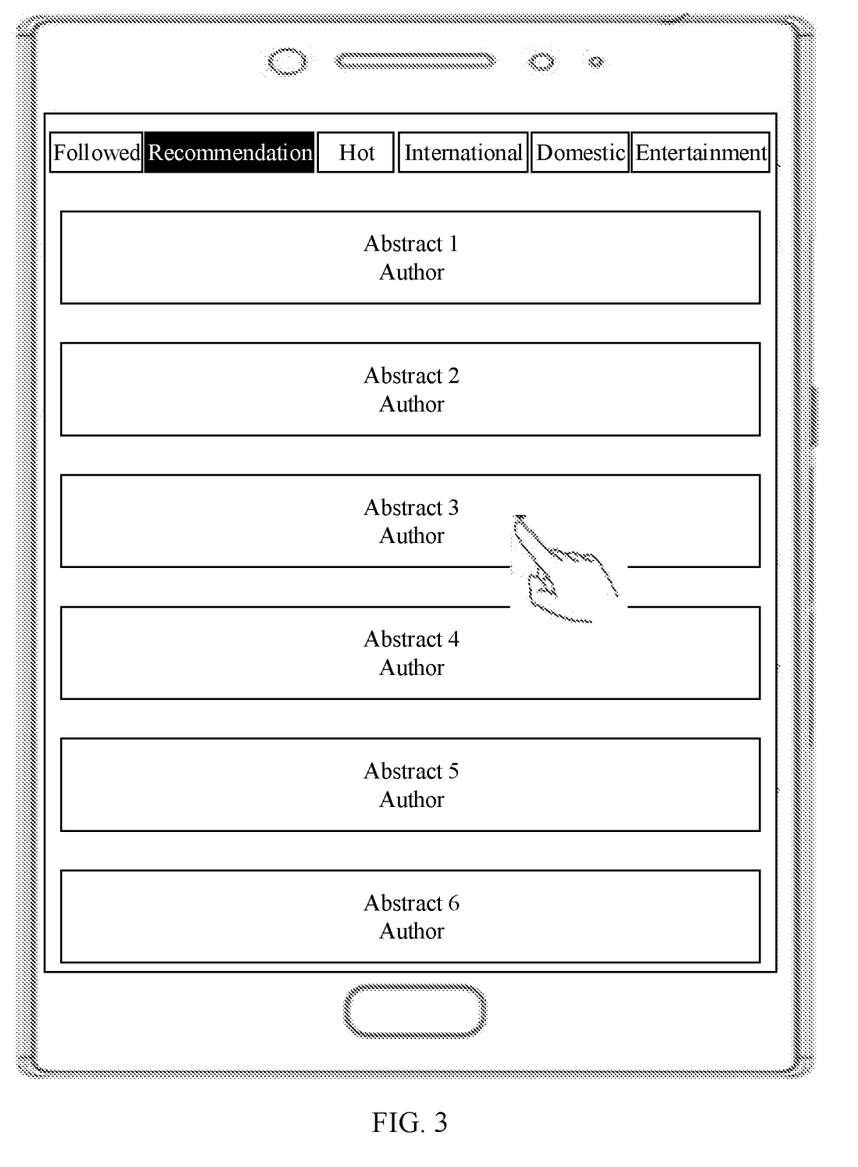
FIG. 3 is an example schematic diagram of an abstract presentation manner for a list page.

Each candidate abstract includes the text information and at least one of the thumbnails, and M is a natural number. In this disclosure, the server extracts the text information (for example, a title) from the content object, and generates a plurality of candidate abstracts with reference to the foregoing thumbnails. A specific form of the candidate abstract is related to an abstract presentation manner for a list page in a terminal device. For example, there may be the following three abstract presentation manners for the list page:

(1) Text-Only Style

There is only a title but no thumbnail on the list page, for example, as shown in FIG. 3.

Figure 4:
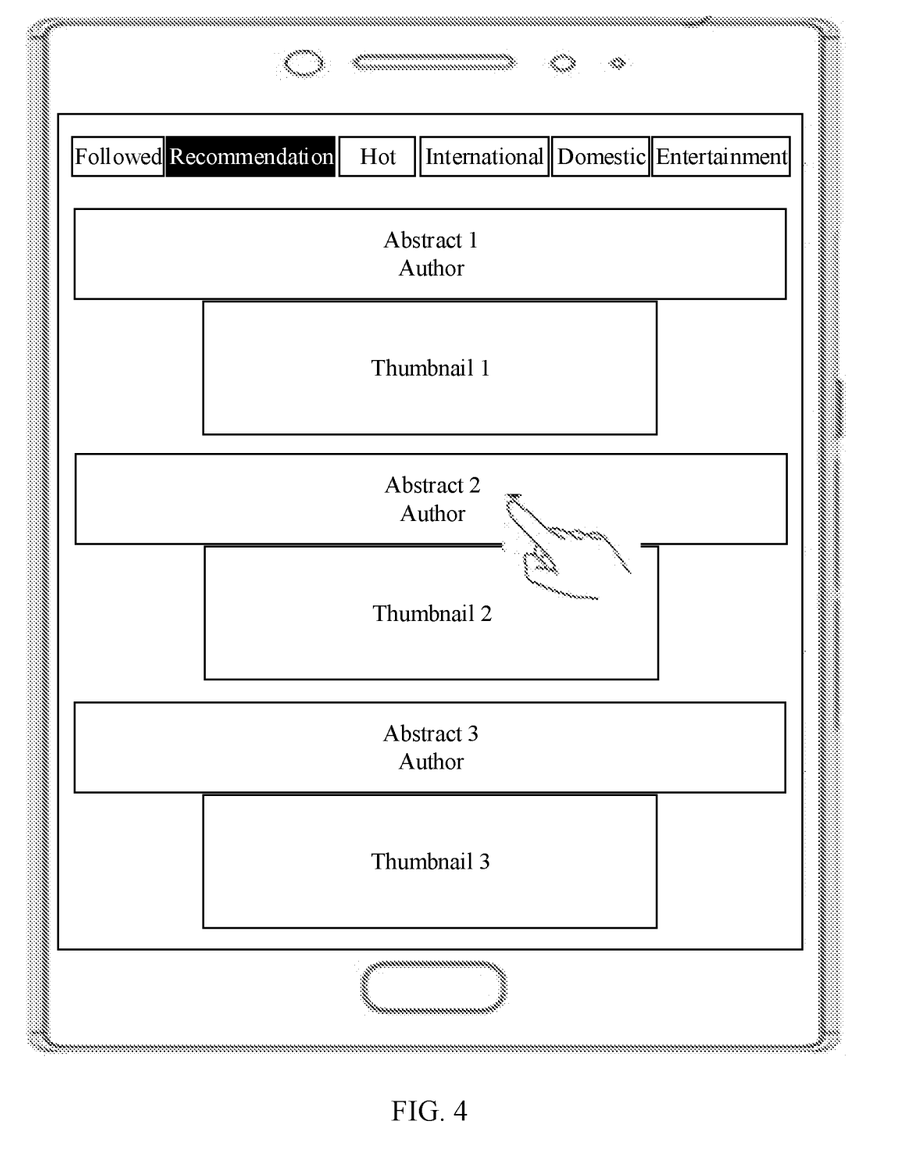
FIG. 4 is an example schematic diagram of another abstract presentation manner for a list page.

(2) Single-Picture Style

There is one thumbnail on the list page in addition to a title. The thumbnail is selected from the N thumbnails, for example, as shown in FIG. 4.

Figure 5:
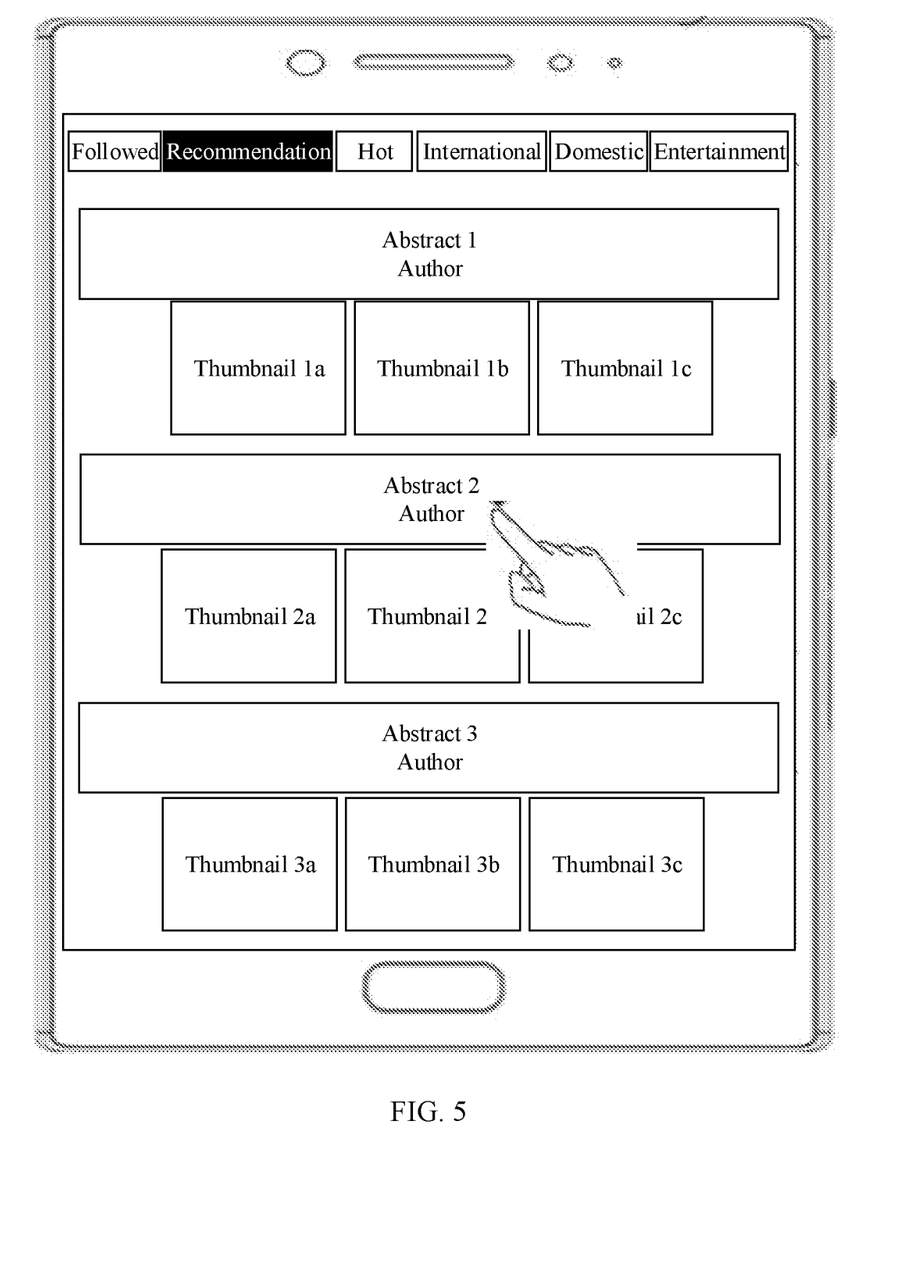
FIG. 5 is an example schematic diagram of a third abstract presentation manner for a list page.

(3) Three-Picture Style

There are three thumbnails on the list page in addition to a title. The three thumbnails are selected from the N thumbnails, for example, as shown in FIG. 5.

Figure 6:
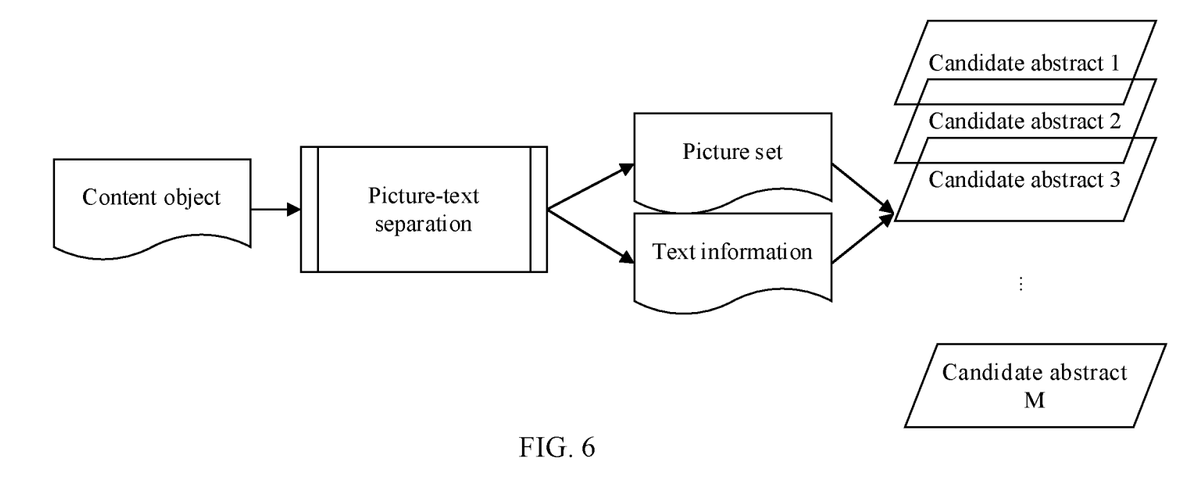
FIG. 6 is a schematic flowchart of a method for separating a picture from text according to this disclosure.

In this disclosure, only a case in which there is a picture in an abstract needs to be considered. Therefore, in addition to the text-only style, based on the abstract presentation manners for the list page in (2) and (3), the candidate abstracts may also be classified into two types: One type is that each candidate abstract includes a title and one thumbnail, and the thumbnail is any thumbnail selected from the N thumbnails, so that a total of N candidate abstracts may be obtained. The other type is that each candidate abstract includes a title and three thumbnails, and the three thumbnails are any three thumbnails selected from the N thumbnails, so that $P_N^3$ candidate abstracts may be obtained. As shown in FIG. 6, the server separates a picture from text for the content object, to obtain the text information and a picture set. The text information may be a title of the content object. The picture set includes the N thumbnails obtained based on the N pictures in the content object, and the M candidate abstracts are generated based on the text information and the N thumbnails.

It should be noted that three abstract presentation manners for the list page are provided above as examples, and content included in a to-be-obtained candidate abstract is correspondingly provided as an example. However, an abstract on the list page may alternatively be presented in another manner provided that a prompt of the content object can be presented to the user. This is not specifically limited. Correspondingly, the content included in the candidate abstract is not specifically limited in this disclosure.

Step 204: Obtain preference information of the user.

The preference information is obtained based on historical operation information of the user and/or attribute information of the user. The historical operation information includes at least one of the following information: a title, a category, and an author that are of a historical content object tapped by the user, a quantity of tapping times and a tapping time that are of each historical content object, and viewing duration of each historical content object; the attribute information includes at least one of the following information: a sex, an age, and a location that are of the user, and a label selected by the user; and the preference information includes at least one of the following information: a category of a content object preferred by the user, a subject of the content object preferred by the user, and an affiliation of the content object preferred by the user.

Different users have their own interests and preferences for news, videos, and pictures. The terminal device obtains the historical operation information of the user, for example, the title, the category, and the author that are of the historical content object tapped by the user, the quantity of tapping times and the tapping time that are of each historical content object, and the viewing duration of each content object, and reports the historical operation information to the server. The server analyzes a category, a subject, and an author that are of a content object that the user likes. Generally, when registering an account, the user fills in attribute information such as a sex, an age, a location (for example, birthplace, a home address, and workplace), and a label (for example, fashion, movie, travel, and music) indicating a preference of the user. The server may analyze and summarize a plurality of categories of the user with reference to the attribute information based on big data statistics, and then obtain a preference of users of a same category.

Step 205: Select one of the M candidate abstracts as an abstract of the content object based on the preference information.

The server may obtain scores of the M candidate abstracts. The score is used to indicate that a possibility that a corresponding candidate abstract is tapped, and a higher score indicates a greater possibility that the corresponding candidate abstract is tapped. Then, the server selects a candidate abstract with a highest score from the M candidate abstracts as the abstract.

Figure 7:
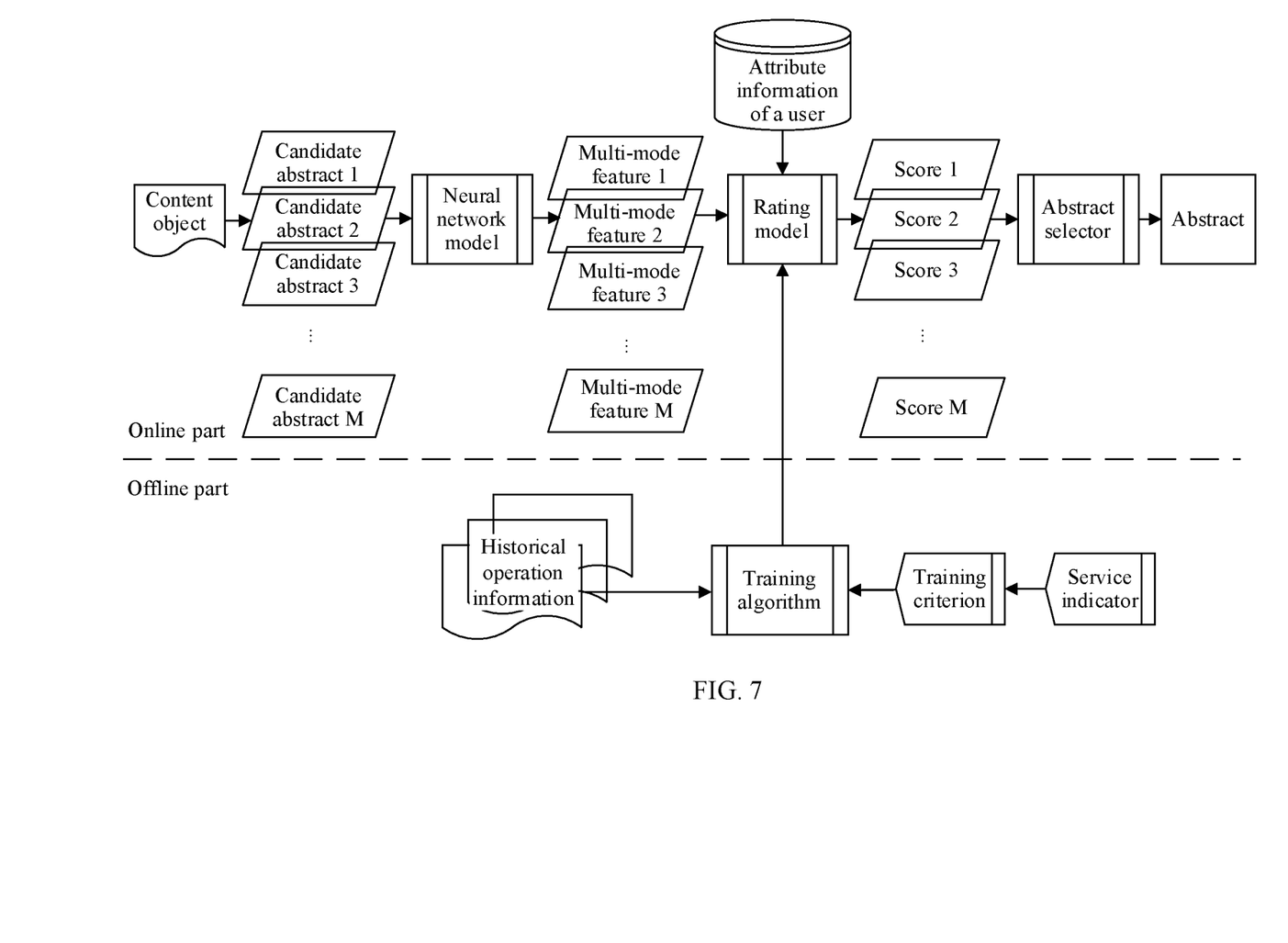
FIG. 7 is a schematic flowchart of Embodiment 1 of an abstract generation method according to this disclosure.

A rating manner in this disclosure may be as follows: The server extracts, by using a neural network model, features from text information and a thumbnail that are included in each of the M candidate abstracts, to obtain M multi-mode features, where each multi-mode feature includes a text feature of text information of a corresponding candidate abstract and an image feature of a thumbnail; and then, the server separately rates the M multi-mode features by using a rating model obtained through pre-training, to obtain scores of the M multi-mode features as the scores of the corresponding M candidate abstracts. As shown in FIG. 7, the rating model is divided into two parts: online and offline. The offline part is a training process of the rating model, and the online part is an application process of the rating model.

The training process of the rating model includes: first, converting a service indicator of the content object into a training criterion for the rating model, where for example, the service indicator of the content object is a tapping rate, so that a target problem is converted into a binary classification problem (for example, the user taps the content object or the user does not tap the content object), and the training criterion may be set to a cross entropy criterion; then, converting the historical operation information of the user into a positive training sample and a negative training sample with reference to the training criterion, where for example, in content objects that have been presented to the user, a content object tapped by the user represents the positive sample, and a content object that is not tapped by the user represents the negative sample; and finally, performing training by using a set of the positive and negative samples, to obtain a final rating model. The server may use the following abstract features:

(1) There is a quantifiable service indicator.
(2) The service indicator is converted into a training criterion for machine learning.
(3) A sample selection method is determined by the service indicator, and selection is performed from the historical operation information of the user to form a positive sample and a negative sample.
(4) A feature is extracted from the training sample.
(5) A specific algorithm is selected as a training algorithm, and a machine learning model is trained based on the training sample.

The application process of the rating model includes the following:

The server extracts, by using the neural network model, features from the text information and the thumbnail that are included in each of the M candidate abstracts, to obtain the M multi-mode features, rates the M multi-mode features by using the rating model trained in the offline part and with reference to the attribute information of the user such as the sex, the age, and the location that are of the user and the label selected by the user, and obtains the scores of the M multi-mode features as the scores of the corresponding M candidate abstracts. The obtained M scores pass through an abstract selector, and a candidate abstract with a highest score is used as the abstract. Because the rating model is obtained through training based on the service indicator, a score rated by the rating model also reflects impact exerted by the content object on the service indicator.

A rating manner in this disclosure may alternatively be: obtaining the scores of the M candidate abstracts based on the preference information by using an explore and exploit policy. The server counts a possibility that each candidate abstract is tapped by the user, and a quantity of times that each candidate abstract is actually tapped by the user is divided by a quantity of times that the candidate abstract is displayed, to indicate popularity of the candidate abstract for the user. In an actual calculation process, a candidate abstract that has never been displayed to the user or a candidate abstract that has been presented for a relatively small quantity of times is smoothed in a specific manner, and usually, a small number is added to each of a molecule and a denominator. A common feature of E&E algorithms is that a service indicator selected from a range of a limited quantity of selection times based on candidate existing statistics information by using a specific candidate selection policy is maximum, such as a quantity of tapping times of the user.

The server obtains the scores of the M candidate abstracts by using the foregoing rating process, and selects a candidate abstract with a highest score as the abstract of the content object.

Step 206: Send the abstract to the terminal device.

When the server sends the determined abstract with the highest score to the terminal device, the abstract is displayed on a list page of the terminal device. Because the abstract is obtained by considering the preference information obtained based on the historical operation information of the user and/or the attribute information of the user, it is possible that the abstract is preferred by the user and is representative. Therefore, the possibility that the user taps the abstract is significantly improved, so that a content object delivery effect is improved.

When the terminal device performs the abstract generation method, a difference from step 206 is that the terminal device does not need to send the abstract, and the abstract is directly displayed after the abstract is determined.

In this disclosure, a thumbnail is selected from the content object based on the preference information of the user, and is used for generating the abstract. In the abstract, the preference information obtained based on the historical operation information of the user and/or the attribute information of the user is considered, and therefore, the abstract is representative, so that a possibility that the user taps the abstract can be increased, and a content object delivery effect can be improved.

Figure 8:
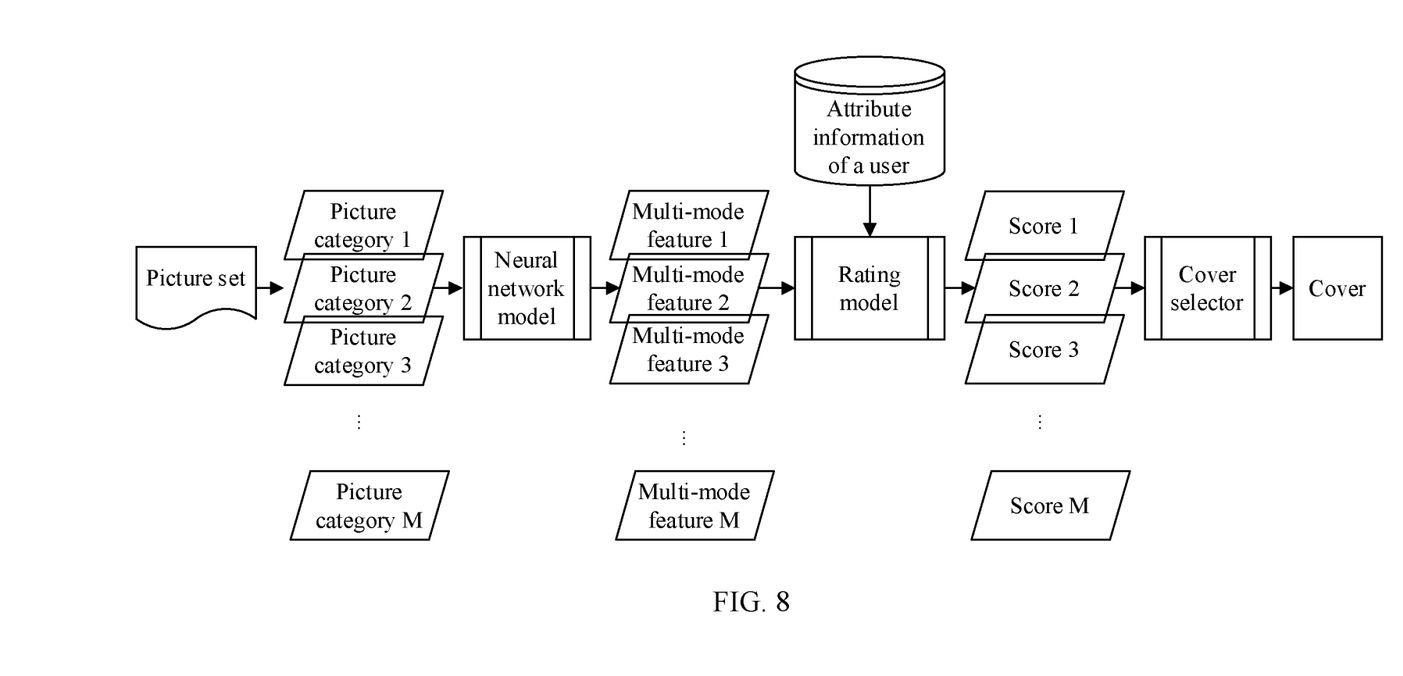
FIG. 8 is a schematic flowchart of Embodiment 2 of an abstract generation method according to this disclosure.

In an optional implementation, FIG. 8 is a schematic flowchart of Embodiment 2 of an abstract generation method according to this disclosure. As shown in FIG. 8, the method in this embodiment may be performed by a terminal device, and a thumbnail is mainly selected as a customized cover of a video or a picture set of a terminal user.

Similar to the foregoing embodiment, in this embodiment, steps 201 to 205 also need to be used to generate M multi-mode features. A difference lies in that before the multi-mode features are generated, the terminal device first classifies image frames in the video, or classifies pictures in the picture set. A classification method may be various clustering algorithms in machine learning, such as a k-means algorithm, a hierarchical clustering algorithm, and a density-based clustering algorithm. After classification, the terminal device may select a representative picture from each item obtained through classification, to generate the multi-mode feature. The picture may be randomly selected, or may be a picture that includes a maximum quantity of common features in the items obtained through classification, or may be selected based on preference information of a user. In this embodiment, text information used to generate the multi-mode feature is a name of the video or the picture set, and a thumbnail is the foregoing selected thumbnail of the picture.

In this embodiment, the preference information of the user may include but is not limited to a degree of attention of the user to a picture type, for example, a picture type (a landscape or a figure) that is frequently photographed or viewed by the user, a degree of attention of the user to a specific population, for example, a photo of a baby that is frequently photographed or viewed by the user, and the terminal device trains a rating model based on the preference information of the user. Then, with reference to attribute information of the user, a rating model rates the M multi-mode features, to obtain scores of the M multi-mode features as scores of corresponding M pictures. Finally, when generating the cover, the terminal device successively selects a corresponding quantity of pictures from a score sequence in descending order based on a quantity of pictures required by the cover, to generate a final cover.

Figure 9:
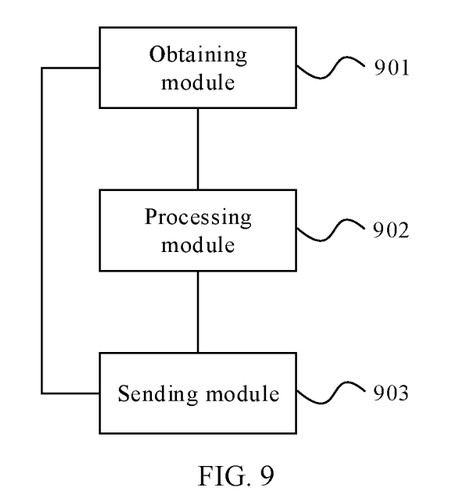
FIG. 9 is a schematic diagram of a structure of an embodiment of an abstract generation apparatus according to this disclosure.

FIG. 9 is a schematic diagram of a structure of an embodiment of an abstract generation apparatus according to this disclosure. As shown in FIG. 9, the apparatus in this embodiment may be applied to the server in FIG. 1, and the abstract generation apparatus may include an obtaining module 901, a processing module 902, and a sending module 903. The obtaining module 901 is configured to obtain a content object, where the content object includes text information and N pictures, and N is a natural number. The processing module 902 is configured to: obtain N thumbnails based on the N pictures, and generate M candidate abstracts based on the text information and the N thumbnails, where each candidate abstract includes the text information and at least one of the thumbnails, and M is a natural number. The obtaining module 901 is further configured to obtain preference information of a user, where the preference information is obtained based on historical operation information of the user and/or attribute information of the user. The processing module 902 is further configured to select one of the M candidate abstracts as an abstract of the content object based on the preference information. The sending module 903 is configured to display the abstract or send the abstract to a terminal device.

In an optional implementation, the historical operation information includes at least one of the following information: a title, a category, and an author that are of a historical content object tapped by the user, a quantity of tapping times and a tapping time that are of each historical content object, and viewing duration of each content object; the attribute information includes at least one of the following information: a sex, an age, and a location that are of the user, and a label selected by the user; and the preference information includes at least one of the following information: a category of a content object preferred by the user, a subject of the content object preferred by the user, and an affiliation of the content object preferred by the user.

In an optional implementation, the text information is a title of the content object.

In an optional implementation, the processing module 902 is specifically configured to: obtain scores of the M candidate abstracts, where the score is used to indicate a possibility that a corresponding candidate abstract is tapped, and a higher score indicates a greater possibility that the corresponding candidate abstract is tapped; and select a candidate abstract with a highest score from the M candidate abstracts as the abstract.

In an optional implementation, the processing module 902 is specifically configured to: extract, by using a neural network model, features from text information and a thumbnail that are included in each of the M candidate abstracts, to obtain M multi-mode features, where each multi-mode feature includes a text feature of text information of a corresponding candidate abstract and an image feature of a thumbnail; and separately rate the M multi-mode features by using a rating model obtained through pre-training, to obtain scores of the M multi-mode features as the scores of the corresponding M candidate abstracts.

In an optional implementation, the processing module 902 is further configured to: obtain the rating model through training based on historical preference information of the user.

In an optional implementation, the processing module 902 is specifically configured to: obtain the scores of the M candidate abstracts based on the preference information by using an explore and exploit policy.

The apparatus in this embodiment may be configured to execute the technical solutions of the method embodiment shown in FIG. 2. Implementation principles and technical effects are similar, and details are not described herein again.

Figure 10:
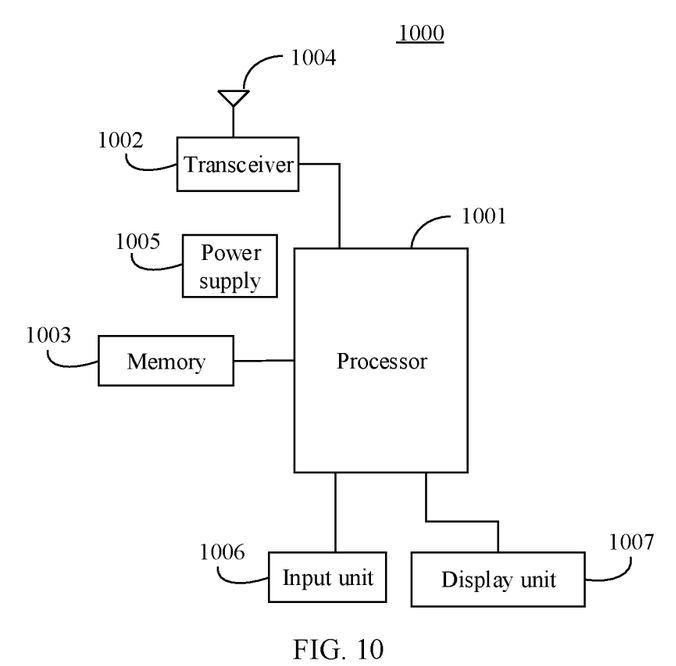
FIG. 10 is a schematic diagram of a structure of a server 1000 according to this disclosure.

FIG. 10 is a schematic diagram of a structure of a server 1000 according to this disclosure. As shown in FIG. 10, the server 1000 includes a processor 1001 and a transceiver 1002.

Optionally, the server 1000 further includes a memory 1003. The processor 1001, the transceiver 1002, and the memory 1003 may communicate with each other through an internal connection path, to transfer a control signal and/or a data signal.

The memory 1003 is configured to store a computer program. The processor 1001 is configured to execute the computer program stored in the memory 1003, to implement functions of the abstract generation apparatus in the foregoing apparatus embodiment.

Optionally, the memory 1003 may be integrated into the processor 1001, or may be independent of the processor 1001.

Optionally, the server 1000 may further include an antenna 1004, configured to transmit a signal output by the transceiver 1002. Alternatively, the transceiver 1002 receives a signal through the antenna.

Optionally, the server 1000 may further include a power supply 1005, configured to supply power to various components or circuits in the server.

In addition, to improve the functions of the server, the server 1000 may further include an input unit 1006 and a display unit 1007 (or may be considered as an output unit).

Figure 11:
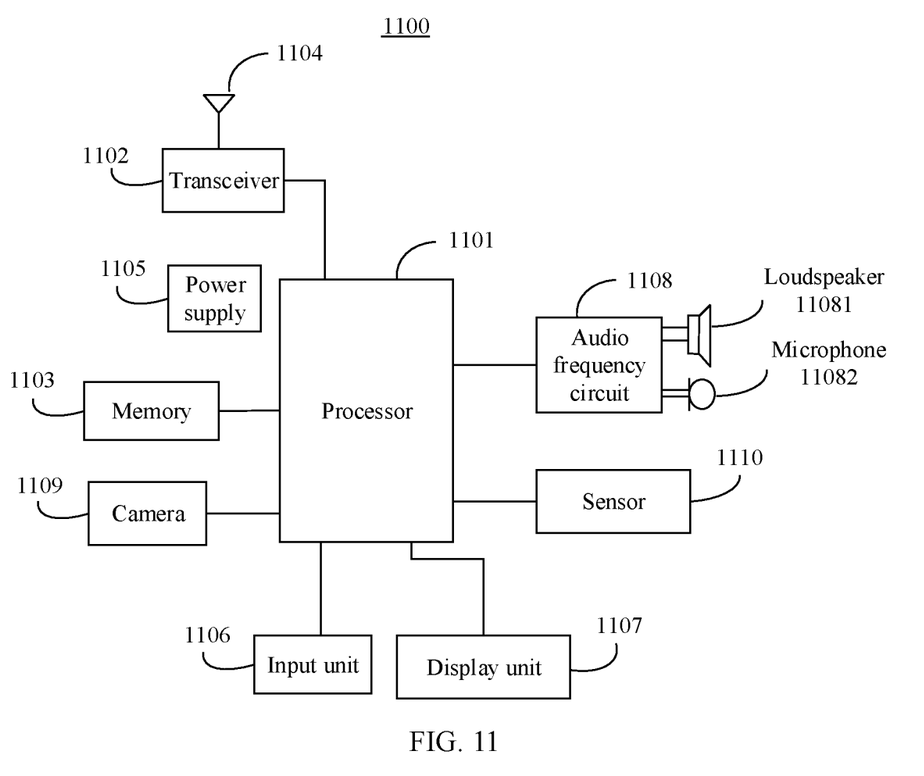
FIG. 11 is a schematic diagram of a structure of a terminal device 1100 according to this disclosure.

FIG. 11 is a schematic diagram of a structure of a terminal device 1100 according to this disclosure. As shown in FIG. 11, the terminal device 1100 includes a processor 1101 and a transceiver 1102.

Optionally, the terminal device 1100 further includes a memory 1103. The processor 1101, the transceiver 1102, and the memory 1103 may communicate with each other through an internal connection path, to transfer a control signal and/or a data signal.

The memory 1103 is configured to store a computer program. The processor 1101 is configured to execute the computer program stored in the memory 1103, to implement functions of the abstract generation apparatus in the foregoing apparatus embodiment.

Optionally, the memory 1103 may be integrated into the processor 1101, or may be independent of the processor 1101.

Optionally, the terminal device 1100 may further include an antenna 1104, configured to transmit a signal output by the transceiver 1102. Alternatively, the transceiver 1102 receives a signal through the antenna.

Optionally, the terminal device 1100 may further include a power supply 1105, configured to supply power to various devices or circuits in the terminal device.

In addition, to improve the functions of the terminal device, the terminal device 1100 may further include one or more of an input unit 1106, a display unit 1107 (or may be considered as an output unit), an audio circuit 1108, a camera 1109, a sensor 1110, and the like. The audio circuit may further include a speaker 11081, a microphone 11082, and the like. Details are not described herein.

In addition, to improve the functions of the terminal device, the terminal device 1100 may further include an input unit 1106 and a display unit 1107 (or may be considered as an output unit).

This disclosure further provides a computer-readable storage medium. The computer-readable storage medium stores a computer program. When the computer program is executed by a computer, the computer is enabled to perform the steps and/or the processing in any foregoing method embodiments.

In an implementation process, steps in the foregoing method embodiments can be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor or the like. Steps in the methods disclosed in the embodiments of this disclosure may be directly performed and accomplished by a hardware coding processor, or may be performed and accomplished by a combination of hardware and software modules in the coding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The memory in the foregoing embodiments may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through examples rather than limitative descriptions, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these and any memory of another proper type.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed system, apparatus, and method may be implemented in other manners. For example, the described apparatus embodiment is merely an example. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the conventional technology, or some of the technical solutions may be implemented in the form of a software product. The software product is stored in a storage medium and includes several instructions for instructing a computer device (which is a personal computer, a server, or a network device) to perform all or some of the steps of the methods described in the embodiments of this disclosure. The storage medium includes any medium that can store program code such as a USB flash drive, a removable hard disk, a read-only memory (ROM), a random access memory (RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. An abstract generation method, comprising:
    obtaining a content object, wherein the content object comprises text information and N pictures, and N is a natural number;
    obtaining N thumbnails based on the N pictures;
    generating M candidate abstracts based on the text information and the N thumbnails, wherein each candidate abstract comprises the text information and a plurality of separate thumbnails among the N thumbnails, and M is a natural number;
    obtaining preference information of a user, wherein the preference information is obtained based on historical operation information of the user or attribute information of the user;
    selecting one of the M candidate abstracts as an abstract of the content object based on the preference information; and
    displaying the abstract among abstracts related to other content objects or sending the abstract to a terminal device with abstracts related to other content objects.

2. The method according to claim 1, wherein the historical operation information comprises at least one of the following information: a title of a historical content object tapped by the user, a category of the historical content object, an author of the historical content object, a quantity of tapping times of the historical content object, a tapping time of the historical content object, and a viewing duration of the historical content object;
    the attribute information comprises at least one of the following: a sex of the user, an age of the user, a location of the user, and a label selected by the user; and
    the preference information comprises at least one of the following: a category of a content object preferred by the user, a subject of the content object preferred by the user, and an affiliation of the content object preferred by the user.

3. The method according to claim 1, wherein the text information is a title of the content object.

4. The method according to claim 1, wherein the selecting one of the M candidate abstracts as an abstract of the content object based on the preference information comprises:
    obtaining scores of the M candidate abstracts, wherein the score indicates a probability that a corresponding candidate abstract is tapped, and a higher score indicates a greater probability that the corresponding candidate abstract is tapped; and
    selecting a candidate abstract with a highest score from the M candidate abstracts as the abstract.

5. The method according to claim 4, wherein the obtaining scores of the M candidate abstracts comprises:
    extracting, by using a neural network model, features from text information and a thumbnail that are comprised in each of the M candidate abstracts, to obtain M multi-mode features, wherein each multi-mode feature comprises a text feature of text information of a corresponding candidate abstract and an image feature of a thumbnail; and
    separately rating the M multi-mode features by using a rating model obtained through pre-training, to obtain scores of the M multi-mode features as the scores of the corresponding M candidate abstracts.

6. The method according to claim 5, before the obtaining preference information of a user, further comprising:
    obtaining the rating model through training based on preference information of the historical user.

7. The method according to claim 4, wherein the obtaining scores of the M candidate abstracts comprises:
    obtaining the scores of the M candidate abstracts based on the preference information by using an explore and exploit policy.

8. An abstract generation apparatus, comprising:
    a memory storing executable instructions;
    a processor configured to execute the executable instructions to perform operations of:
    obtaining a content object, wherein the content object comprises text information and N pictures, and N is a natural number;
    obtaining N thumbnails based on the N pictures;
    generating M candidate abstracts based on the text information and the N thumbnails, wherein each candidate abstract comprises the text information and a plurality of separate thumbnails among the N thumbnails, and M is a natural number;
    obtaining preference information of a user, wherein the preference information is obtained based on historical operation information of the user or attribute information of the user;
    selecting one of the M candidate abstracts as an abstract of the content object based on the preference information; and
    displaying the abstract among abstracts related to other content objects or sending the abstract to a terminal device with abstracts related to other content objects.

9. The abstract generation apparatus according to claim 8, wherein the historical operation information comprises at least one of the following information: a title of a historical content object tapped by the user, a category of the historical content object, an author of the historical content object, a quantity of tapping times of the historical content object, a tapping time of the historical content object, and a viewing duration of the historical content object;

the attribute information comprises at least one of the following: a sex of the user, an age of the user, a location of the user, and a label selected by the user; and the preference information comprises at least one of the following: a category of a content object preferred by the user, a subject of the content object preferred by the user, and an affiliation of the content object preferred by the user.

10. The abstract generation apparatus according to claim 8, wherein the text information is a title of the content object.

11. The abstract generation apparatus according to claim 8, wherein the selecting one of the M candidate abstracts as an abstract of the content object based on the preference information comprises:

obtaining scores of the M candidate abstracts, wherein the score indicates a probability that a corresponding candidate abstract is tapped, and a higher score indicates a greater probability that the corresponding candidate abstract is tapped; and selecting a candidate abstract with a highest score from the M candidate abstracts as the abstract.

12. The abstract generation apparatus according to claim 11, wherein the obtaining scores of the M candidate abstracts comprises:

extracting, by using a neural network model, features from text information and a thumbnail that are comprised in each of the M candidate abstracts, to obtain M multi-mode features, wherein each multi-mode feature comprises a text feature of text information of a corresponding candidate abstract and an image feature of a thumbnail; and separately rating the M multi-mode features by using a rating model obtained through pre-training, to obtain scores of the M multi-mode features as the scores of the corresponding M candidate abstracts.

13. The abstract generation apparatus according to claim 12, before the obtaining preference information of a user, the processor is further configured to execute the executable instructions to perform the operations of:

obtaining the rating model through training based on preference information of the historical user.

14. The abstract generation apparatus according to claim 11, wherein the obtaining scores of the M candidate abstracts comprises:

obtaining the scores of the M candidate abstracts based on the preference information by using an explore and exploit policy.

15. A computer-readable storage medium, comprising a computer program, wherein when the computer program is executed on a computer, the computer is configured to execute the executable instructions to perform operations of:

obtaining a content object, wherein the content object comprises text information and N pictures, and N is a natural number;

obtaining N thumbnails based on the N pictures;

generating M candidate abstracts based on the text information and the N thumbnails, wherein each candidate abstract comprises the text information and a plurality of separate thumbnails among the N thumbnails, and M is a natural number;

obtaining preference information of a user, wherein the preference information is obtained based on historical operation information of the user or attribute information of the user;

selecting one of the M candidate abstracts as an abstract of the content object based on the preference information; and displaying the abstract among abstracts related to other content objects or sending the abstract to a terminal device with abstracts related to other content objects.

* * * * *